Patented May 3, 1932

1,856,351

UNITED STATES PATENT OFFICE

REGINALD HILL MONK AND LUDVIG FIRING, OF MONTREAL, QUEBEC, CANADA

PRODUCTION OF TITANATES

No Drawing.   Application filed August 10, 1928.  Serial No. 298,876.

This invention relates to a process for the production of titanates eminently suitable for use as pigments, owing to their purity of colour, degree of opacity and softness of texture, and more particularly to the treatment of titanium hydrate, as ordinarily precipitated from titanium sulphate solution by hydrolysis.

The invention also relates to the pigment produced by means of this process. The pigment so produced is characterized in having substantially porous particles presenting to light incident thereon a large number of plane surfaces inclined in different directions, thus causing a maximum scattering of light and presenting great opacity as well as softness of texture. Furthermore the yellow tint so commonly found associated with such pigments is not found in the product of this invention.

It has been found that under ordinary conditions solutions of titanium in sulphuric acid consist mainly of titanyl sulphates $(TiOSO_4)$ and when hydrolyzed crystalline meta titanic acid, $TiO(OH)_2$, is formed. A titanate produced from this modification of titanic acid is not satisfactory as a pigment. It lacks opacity, is hard in texture, and is not of a good colour.

On the other hand when this crystallin precipitate has been dispersed into a colloidal solution, and subsequently coagulated according to the method described below, it is found that a pigment of satisfactory opacity and colour can be produced. The reason for this is that the crystalline meta titanic acid is converted into a porous variety of ortho titanic acid $Ti(OH)_4$.

It is thus an object of this invention to provide a process for the treatment of precipitated titanium hydrate, wherein settling, washing and filtering can be carried on in a relatively short period of time and which will produce a product having all the physical characteristics of an efficient titanium pigment.

Briefly stated the process comprises the precipitation of titanium hydrate in the usual crystalline form from a sulphate solution by hydrolysis, treatment of the hydrate with a peptizing agent to form a colloidal dispersion, the coagulation of the colloidal dispersed mass to form particles of such size as will readily precipitate and settle out, and calcining the same to form a titanate which possesses the required opacity and softness of texture.

The invention will now be described in more detail by way of example as to how the same may be carried out.

To a titanium hydrate containing crystals of an average size of from 6 to 18 $\mu$ there is added a peptizing agent, such as nitric or hydrochloric acid or a nitrate or halogen salt, and the mixture is agitated sufficiently to give a colloidal dispersion of the required particle size, say $\frac{1}{3}$ to $\frac{1}{2}$ $\mu$. This agitation usually occupies 20 to 30 minutes when the solution is cold, but the time may be considerably shortened by heating the solution. The solution may be heated to the boiling point if desired. For example, there is added to the crystalline titanium hydrate barium chloride amounting to approximately 14% of the $TiO_2$ present. Barium sulphate is thus precipitated and can be removed by settling since the $TiO_2$ remains in suspension. While this percentage of barium chloride gives good results it may be varied within wide limits and sufficient to form barium titanate with the $TiO_2$ may be added to peptize the pulp.

It is not necessary to free the titanium hydrate from $SO_4$ before peptizing, since on the addition of barium chloride, for example, as the peptizing agent, barium sulphate is formed which is sufficiently heavy to readily settle out on standing and which may thus be substantially completely separated from the dispersed titanium hydrate. In this way the hydrate may be freed from adsorbed $SO_3$ and the peptizing proceeds with the excess barium chloride present after the $SO_3$ has been removed. Moreover, the presence of some $SO_3$ in the hydrate is desirable when using barium chloride as the peptizing agent since an equivalent of hydrochloric acid is set free upon formation of barium sulphate. The hydrate must be slightly acid for peptization and, therefore if there is no $SO_3$ present, a small amount of nitric or hydrochloric acid should be added to render the hydrate acid.

The titanium hydrate having thus been peptized, a coagulating agent is added with vigorous stirring to cause the dispersed hydrate to coagulate, precipitate and settle out of colloidal suspension in substantially porous particles having a diameter of, say, 20 $\mu$ and which exhibit no colloidal or crystalline characteristics. It will be noted that these particles are of substantially the same size as the original hydrate crystals but exhibit an essentially different structure, which is characteristic of the product of this invention and imparts to the product the essentials of a good titanium pigment, from the point of view of opacity and texture. During the course of coagulation, the hydrogen ion concentration of the solution changes and coagulation is complete when the solution exhibits a pH of substantially 8.5.

In the above mentioned specific example, after the removal of barium sulphate, barium carbonate, chemically equivalent to the $TiO_2$ present, is added with vigorous stirring.

As coagulating agent, there may be used any substance which it is desirable to employ in the formation of a titanate, and which contains an ion of opposite charge to the dispersed titanic acid particles. Such substances are the carbonates, oxides, and hydroxides of the alkaline earth metals or of any metal the oxides of which are white. It will be observed that a titanate only of the coagulant is formed when the coagulant used is an oxide, hydrate or carbonate of the metals specified and when the temperature is such as to cause the conversion.

The mass of coagulated particles after washing with water is then dried and subjected to calcination at the temperature required to convert the same to the titanate. The contact between the dispersed hydrate and the coagulant in the mass is so intimate that conversion is effected in a minimum of time and thus appreciable growth in crystal size is prevented. This speed of reaction is important not only from the point of view of economy, but is essential in producing a product having the desired opacity.

Referring again to the specific example, the mixture is diluted with water and allowed to settle. After decantation the precipitate is preferably mixed with water to wash and again settled. After the water is decanted, the final precipitate, which still contains a small proportion of barium chloride is dried and calcined at about 840° C. to produce a pure white pigment. The barium chloride acts as a catalyst in the conversion of the precipitate to the titanate.

It will be apparent however that while a temperature of about 840° C. is best suited for the production of barium titanate from the reacting substances, the temperature at which calcination is effected is maintained as low as possible for the different reagents, consistent with such speed of reaction as will not permit appreciable growth in particle size and as will maintain purity of colour.

It will be understood that while the invention has been described in detail variations may be made in operation without departing from the scope of the invention as defined in the following claims.

What we claim is:

1. A process for the production of a barium titanate from crystalline titanium hydrate which comprises mixing with vigorous stirring barium chloride with said crystalline hydrate to disperse the same, mixing with the dispersed hydrate barium carbonate to coagulate the same and calcining the coagulated precipitate at a temperature of substantially 840° C. to produce a porous mass of barium titanate without colloidal or crystalline characteristics.

2. A process as defined in claim 1, wherein an excess of said barium chloride is employed to provide a catalyst for the reaction effected upon calcination.

3. A process for the production of titanates of the alkaline earth metals which comprises dispersing precipitated titanium hydrate with halides of the alkaline earth metals or halogen hydrides, coagulating the dispersed hydrate and calcining the coagulated mass at substantially 840° C. in the presence of a catalyst, said catalyst being said dispersing agent.

4. A process for the production of titanates of the alkaline earth metals which comprises mixing with precipitated titanium hydrate a halide of an alkaline earth metal to disperse the said hydrate, mixing with the dispersed hydrate an alkaline earth metal compound, which contains an ion of opposite charge to the dispersed hydrate, to coagulate the same and calcining the coagulated mass at substantially 840° C. in the presence of an alkaline earth metal halide to form said titanates in a pure and finely divided state.

In testimony whereof we have affixed our signatures.

REGINALD HILL MONK.
LUDVIG FIRING